M. DERVOZ.
NUT LOCK.
APPLICATION FILED AUG. 12, 1916.
1,211,553.
Patented Jan. 9, 1917.
2 SHEETS—SHEET 1.
Fig. 1.
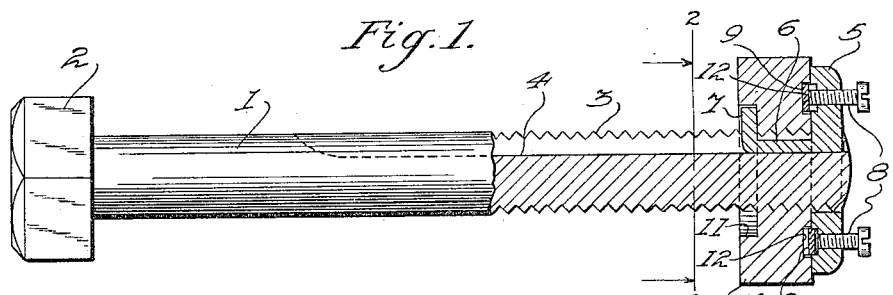
Fig. 2.
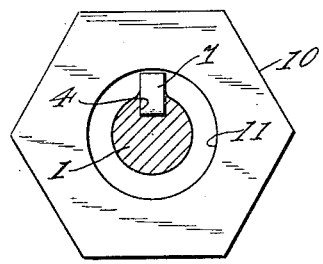
Fig. 3.
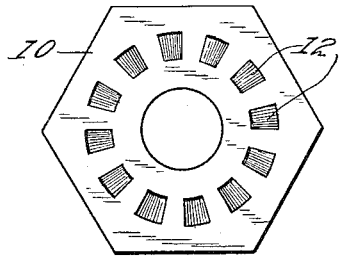
Fig. 4. Fig. 5. Fig. 6.
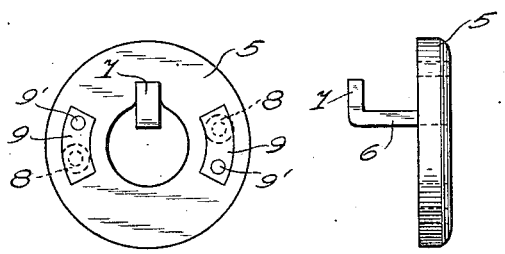
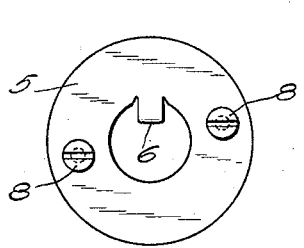
WITNESSES:
Paul A. Viersen
INVENTOR.
Meho Dervoz

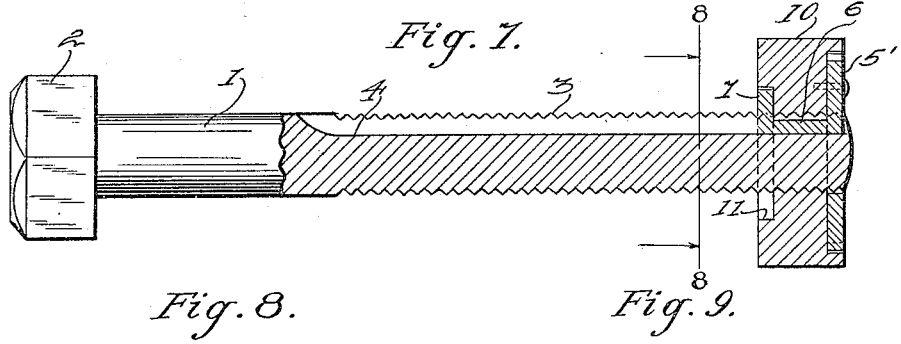
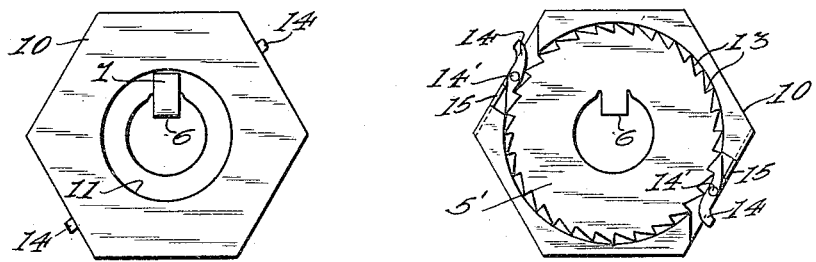
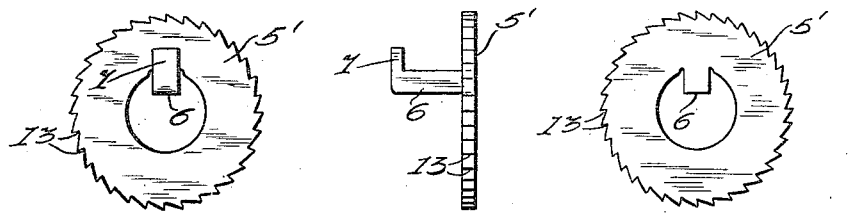
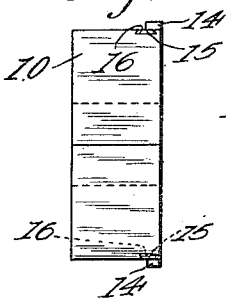

UNITED STATES PATENT OFFICE.

MEHO DERVOZ, OF CHICAGO, ILLINOIS.

NUT-LOCK.

1,211,553.   Specification of Letters Patent.   Patented Jan. 9, 1917.

Application filed August 12, 1916.   Serial No. 114,515.

*To all whom it may concern:*

Be it known that I, MEHO DERVOZ, a subject of the Emperor of Austria-Hungary, residing at Chicago, Cook county, Illinois, have invented a new and useful Improvement in Nut-Locks, of which the following is the specification.

My invention relates to nut locks adapted for use in connection with a longitudinally slotted bolt, and the object of the invention is to provide durable and efficient means for locking the nut in place without damaging the nut in any way, or preventing its removal when desired.

I accomplish my object by the mechanism illustrated in the accompanying drawings, in which:

Figure 1 is an assembly view of a nut and bolt embodying my invention, part of the view being in longitudinal section. Fig. 2 is a view taken on the line 2—2, Fig. 1. Fig. 3 is a view of the outer face of the nut. Figs. 4, 5 and 6 are different views of the locking plate. Fig. 7 is an assembly view of a modified form of the invention, in which the ratchet teeth are formed in the periphery of the locking plate instead of the outer face of the nut. Fig. 8 is a view of the inner face of the nut shown in Fig. 7, the view being taken from the line 8—8, Fig. 7. Fig. 9 is a view of the outer face of the nut shown in Fig. 7 and of the locking plate associated therewith. Figs. 10, 11 and 12 are different views of the modified form of locking plate shown in Fig. 7. Fig. 13 is an end view of the modified form of nut. Fig. 14 is a fragmentary view similar to Fig. 13, but drawn on an enlarged scale to show the mounting of the pawl.

Similar numerals refer to similar parts throughout the several views.

Referring first to the type shown in Figs. 1 to 6, both inclusive, the bolt 1 has a head 2 and a threaded portion 3 as in the ordinary bolt. A slot 4 extends longitudinally from the outer end of the bolt toward the bolt head. A locking plate 5 has a key portion 6 which fits in said slot and travels along it, and hence, prevents the plate from rotating, but permits the plate to slide lengthwise of the bolt. At the inner end the key turns upward and forms a finger 7 which engages the nut 10 and holds it in contact with the plate 5, but at the same time permits the nut to rotate. By preference, an annular chamber or countersink 11 is formed in the inner face of the nut. This receives the finger 7; thus, there is no projection beyond the inner face of the nut.

From the foregoing it will be evident that the nut is rotatable upon the bolt and will travel along it when rotated after the manner of an ordinary nut upon a bolt, but is at all times held in contact with, or close proximity to the locking plate.

Two spring pawls 9 are fastened by pins 9', or otherwise to the inner face of the locking plate as best shown in Fig. 4. The free ends of these springs enter pockets 12 in the outer face of the nut, these pockets being best shown in Fig. 3. The floor of the pocket is oblique, one edge being flush with the outer surface of the nut and the other edge being deeper. The spring pawls engage the walls at the deeper edge of the pocket. The pawls are countersunk in the inner face of the locking plate, and said pawls normally lie within their countersinks so that the nut may be rotated in either direction when the pawls are not in acting condition. The means for forcing the pawls to acting condition are preferably the screws 8, which penetrate the locking plate as shown in Fig. 1 and force the pawls into the pockets in the face of the nut. The pockets and pawls form, in effect, a ratchet mechanism connecting the locking plate and the nut.

The form of device shown in Figs. 1 to 6, both inclusive, operates as follows: The screws 8 are first backed off so that the spring pawls will lie in their countersinks in the inner face of the locking plate. The nut is then screwed onto the bolt, the key 6 entering the end of the slot 4. When the nut has been screwed to the point where it is to be held, the operator screws down the screws 8, thus forcing the spring pawls into the registering pockets 12 in the face of the nut. The pawls then hold the nut against rotation, especially in a reverse direction. If it is desired to release the nut, this may be done by backing off the screws 8 until the pawls can enter their countersinks in the locking plate.

In the form shown in Figs. 7 to 14, inclusive, the principle of construction is fundamentally the same. In its modified form however, the locking plate 5' has peripheral ratchet teeth 13 adapted to be engaged by the pawls 14, which are pivoted upon the pins 14′ secured to the outer face of nut as best shown in Figs. 7 and 9. These pawls are held to their work by the springs 15 which, as best shown in Figs. 13 and 14 are fitted into dove tail grooves 16 formed in the side of the nut. By preference, the outer face of the nut is countersunk to receive the locking plate.

In using the modified form shown in Figs. 7 to 14 inclusive, when the nut is rotated in a direction to tighten it, the pawls slip over the ratchet teeth in the locking plate, but prevent rotation in the opposite direction. When it is desired to remove the nut, the user releases the pawls by pressing upon the projecting tails thereof, and this permits the nut to be backed off. It will be understood, of course, that the ratchet teeth face in one direction for a right hand thread and the opposite direction for a left hand thread. In the present illustration, the ratchet teeth face in a direction to be used on a bolt having a left hand thread.

Having thus described my invention, what I claim as new and desire to secure by Letters Patent, is:—

In combination, a bolt having a longitudinal slot, a nut screwing thereon, a locking plate having its inner surface contacting the outer surface of the nut, a key on said plate sliding in said slot, a finger on said key for holding the nut in contact with the locking plate, said nut being countersunk to receive the finger, the outer face of the nut having pockets arranged in a circle concentric with the axis of the bolt, spring pawls mounted on the inner surface of the locking plate and countersunk in said locking plate, and screws screwing into said locking plate to force said pawls into the pockets in the nut.

MEHO DERVOZ.

Copies of this patent may be obtained for five cents each, by addressing the "Commissioner of Patents, Washington, D. C."